US010258995B2

(12) United States Patent
Nagai et al.

(10) Patent No.: US 10,258,995 B2
(45) Date of Patent: Apr. 16, 2019

(54) SOLVENT SEPARATION METHOD, SOLVENT SEPARATION APPARATUS AND SOLVENT SEPARATION SYSTEM

(71) Applicant: Panasonic Corporation, Osaka (JP)

(72) Inventors: Koichi Nagai, Kyoto (JP); Masanori Minamio, Osaka (JP); Toshiro Kanda, Kyoto (JP); Yasuyuki Takano, Osaka (JP); Masahiro Kawata, Osaka (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 15/362,239

(22) Filed: Nov. 28, 2016

(65) Prior Publication Data
US 2017/0239670 A1    Aug. 24, 2017

(30) Foreign Application Priority Data

Feb. 24, 2016  (JP) .................................. 2016-033508

(51) Int. Cl.
| | | |
|---|---|---|
| *B03C 3/01* | (2006.01) | |
| *B01D 53/32* | (2006.01) | |
| *B01D 53/00* | (2006.01) | |
| *B03C 3/014* | (2006.01) | |
| *B03C 3/47* | (2006.01) | |

(52) U.S. Cl.
CPC .............. *B03C 3/01* (2013.01); *B01D 53/002* (2013.01); *B01D 53/323* (2013.01); *B03C 3/014* (2013.01); *B03C 3/47* (2013.01); *B01D 2257/704* (2013.01); *B01D 2257/708* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,653,187 A | * | 4/1972 | Petersen ................ | B01D 47/06 96/281 |
| 3,686,893 A | * | 8/1972 | Edwards ................. | B60H 1/32 417/348 |
| 3,875,268 A | * | 4/1975 | DePass .................. | B01D 53/26 239/224 |
| 3,968,649 A | * | 7/1976 | Edwards .................. | F01N 3/02 422/169 |

(Continued)

FOREIGN PATENT DOCUMENTS

| | | | | |
|---|---|---|---|---|
| DE | 3528122 | * | 2/1987 | ............ B01D 53/06 |
| JP | 64-001702 U | | 1/1989 | |

(Continued)

*Primary Examiner* — Amber R Orlando
*Assistant Examiner* — Sonji Turner
(74) *Attorney, Agent, or Firm* — Panasonic IP Management; Kerry S. Culpepper

(57) ABSTRACT

Provided are a solvent separation method, a solvent separation apparatus, and a solvent separation system that make it possible to easily collect a solvent removed from an exhaust atmosphere and that make it possible to easily carry out maintenance of exhaust gas pathways. An impeller placed in a storage space of a casing is rotated to introduce a gas including a volatilized solvent from an inlet of the casing into the storage space, and the volatilized solvent is cooled and devolatilized by a collection face that has been cooled so as to have a surface temperature lower than the temperature of the gas, to thereby separate the solvent from the gas.

8 Claims, 8 Drawing Sheets

(56) References Cited

U.S. PATENT DOCUMENTS

| | | | | |
|---|---|---|---|---|
| 4,111,615 A * | 9/1978 | Watanabe | ............... | A47L 5/22 415/119 |
| 4,316,726 A | 2/1982 | Hopper | | |
| 5,277,707 A * | 1/1994 | Munk | ............... | B01D 53/1487 95/228 |
| 5,580,368 A * | 12/1996 | Lu | ............... | B03C 3/743 55/DIG. 38 |
| 6,619,054 B1 | 9/2003 | Cargnelli et al. | | |
| 6,638,343 B1 * | 10/2003 | Kawamura | ............... | B01D 47/06 95/218 |
| 6,805,845 B1 * | 10/2004 | Maekawa | ............... | B01D 53/06 422/177 |
| 7,510,599 B2 * | 3/2009 | Brothier | ............... | B01D 8/00 95/73 |
| 8,029,601 B2 * | 10/2011 | Franzen | ............... | B01D 45/14 95/77 |
| 8,596,068 B2 * | 12/2013 | Staffend | ............... | F01C 13/04 60/620 |
| 2003/0218058 A1 * | 11/2003 | Shaw | ............... | B23K 1/012 228/230 |
| 2005/0139073 A1 * | 6/2005 | Rosen | ............... | B01D 45/06 95/218 |
| 2005/0142052 A1 * | 6/2005 | Rosen | ............... | B01D 45/14 423/215.5 |
| 2009/0282973 A1 * | 11/2009 | Nakamura | ............... | B01D 53/002 95/39 |
| 2010/0107687 A1 * | 5/2010 | Andrian | ............... | B01D 45/02 62/620 |
| 2010/0319654 A1 * | 12/2010 | Messmer | ............... | F01C 1/3442 123/243 |
| 2012/0222558 A1 * | 9/2012 | Maskrot | ............... | B01D 47/06 96/53 |
| 2015/0122123 A1 * | 5/2015 | Segawa | ............... | B03C 3/017 95/73 |
| 2016/0040937 A1 | 2/2016 | Cuerdon | | |
| 2016/0310891 A1 * | 10/2016 | Ujino | ............... | B01D 53/323 |
| 2017/0266606 A1 * | 9/2017 | Herm | ............... | B01D 53/0446 |

FOREIGN PATENT DOCUMENTS

| | | | |
|---|---|---|---|
| JP | 5-044223 U | | 6/1993 |
| JP | 2004-301373 | | 10/2004 |
| JP | 2005-524518 | | 8/2005 |
| JP | 2011121101 A | * | 6/2011 |
| JP | 2012-035225 A | | 2/2012 |
| JP | 2014-057935 A | | 4/2014 |
| JP | 2014057935 A | * | 4/2014 |

* cited by examiner

SOLVENT SEPARATION METHOD, SOLVENT SEPARATION APPARATUS AND SOLVENT SEPARATION SYSTEM

TECHNICAL FIELD

The present disclosure relates to a solvent separation method, a solvent separation apparatus and a solvent separation system in which a solvent is removed from a gas that includes a volatilized solvent.

BACKGROUND

In recent years, in a process for assembling and producing various industrial products such as home electronics, and in a process for producing devices such as electronic components, batteries or substrates that serve as components of the above-mentioned industrial products, paste materials that have various functions are coated onto them, and then, they are subjected to heat treatments by use of a heat treatment apparatus. For example, the heat treatment apparatus includes drying furnaces, baking furnaces, cure furnaces, and reflow furnaces. Reflow furnaces are used for soldering in an electronic component-mounting process, etc. Various solvents such as water and organic solvents are mixed into the paste materials in addition to solid contents that are required for final products, in order to adjust the viscosity or performance.

A solvent included in the paste material is released from the paste material to the inside of the heat treatment apparatus through the volatilization and solvent-removing process in the heating step. If the concentration of the volatilized solvents inside the heat treatment apparatus is increased, this possibly leads to various problems. For example, if the concentration of the solvents in the atmosphere inside the heat treatment apparatus comes close to saturation, it may be difficult to dry the object that is subjected to the heat treatment. Therefore, the outside air, a nitrogen gas or other atmosphere gases are regularly or continuously supplied into the heat treatment apparatus, and, simultaneously, the atmosphere inside the heat treatment apparatus and with an increased concentration of solvent is released to the outside.

FIG. 10 is a diagram that illustrates supply of the outside air and discharge of the atmosphere to/from the heat treatment apparatus 1. An air blower 2 supplies the outside air into the heat treatment apparatus 1. An exhaust blower 3 discharges a part of the atmosphere including a volatilized solvent to the outside of the heat treatment apparatus. However, when the solvent is discharged to the outside of the heat treatment apparatus, influences on the environments may be a concern. Therefore, for example, a system disclosed in JP-A-2004-301373 has been known as a method for removing a solvent from an exhaust atmosphere that is discharged to the outside of the heat treatment apparatus.

FIG. 11 is a diagram that illustrates the system disclosed in JP-A-2004-301373. In the disclosed system, a cooler 5, an exhaust duct 6 present outside the heat treatment apparatus, and a mist collector 7 are connected in that order to an exhaust duct 4 inside the heat treatment apparatus of the heat treatment apparatus 1. The cooler 5 cools the exhaust atmosphere that is discharged from the heat treatment apparatus 1, to thus devolatilize the volatilized solvent included in the exhaust atmosphere. The exhaust atmosphere including the devolatilized solvent is delivered into the mist collector 7 through the exhaust duct 6 outside the heat treatment apparatus, and the devolatilized solvent is captured and removed in the mist collector 7. Accordingly, the solvent can be removed from the exhaust atmosphere that is discharged from the heat treatment apparatus 1.

SUMMARY

However, the solvent devolatilized in the cooler 5 is likely to adhere to exhaust pathways. In the structure of JP-A-2004-301373, a part of the devolatilized solvent is not only captured in the mist collector 7, but also adheres to the cooler 5, and exhaust pathways such as the exhaust duct 6 present outside the heat treatment apparatus. As the solvent adheres to the exhaust pathways, and is accumulated thereon, the capability of purifying the exhaust atmosphere will decrease. Therefore, it is required to regularly carry out maintenance in which the exhaust pathways are disassembled, and the solvent accumulated in the exhaust pathways is removed.

In the structure of JP-A-2004-301373, since the devolatilized solvent adheres not only to the mist collector 7 but also to the cooler 5 and the exhaust duct 6 present outside the heat treatment apparatus, and remains on them, maintenance in which the exhaust pathways are disassembled and the solvent is removed is required, and will thus be a bother. Furthermore, since such maintenance is bothersome, and it is required to cause the heat treatment apparatus 1 to stop operation for a long period of time, the operation rate of the heat treatment apparatus 1 will be reduced.

The purpose of the disclosure is to provide a solvent separation method, solvent separation apparatus and solvent separation system that make it possible to easily collect a solvent removed from an exhaust atmosphere, and that make it possible to easily carry out maintenance of exhaust pathways.

According to the first aspect of the disclosure, provided is a solvent separation method for removing a volatilized solvent from a gas, the method including: (i) rotating an impeller that is placed in a storage space of a casing to introduce the gas including the volatilized solvent from an inlet of the casing into the storage space; and (ii) cooling and devolatilizing the volatilized solvent that has been introduced into the storage space, by a collection face that has been cooled so as to have a surface temperature lower than the temperature of the gas, to thereby separate the solvent from the gas.

The above-described solvent separation method may further include, before Step (i), condensing the volatilized solvent with respect to the gas including the volatilized solvent.

The above-described solvent separation method may further include, after Step (ii), applying an electric field to the gas from which the solvent has been separated, to thereby separate the volatilized solvent that remains in the gas.

The above-described solvent separation method may further include: before Step (i), condensing the volatilized solvent with respect to the gas including the volatilized solvent; and after Step (ii), applying an electric field to the gas from which the solvent has been separated, to thereby separate the volatilized solvent that remains in the gas.

Moreover, according to the second aspect of the disclosure, provided is a solvent separation apparatus, including: a casing having an impeller that is provided with multiple blades arrayed around a rotating shaft and that is capable of rotating around the rotating shaft, the casing further having a storage space in which the impeller is placed, an inlet for introducing a gas including a volatilized solvent into the storage space, and an outlet for discharging the gas from the storage space; and a collection part having a collection face that faces the storage space, wherein the collection face is cooled so as to have a surface temperature lower than the temperature of the gas that is introduced from the inlet, wherein the impeller is rotated to introduce the gas from the inlet into the storage space, and then, the volatilized solvent is cooled and devolatilized by the collection face to thereby separate the solvent from the gas.

In the above-described solvent separation apparatus, when a region within which the flow rate of the gas in the vicinity of the inner surface of the casing is approximately equal to the flow rate of the gas that is delivered from the impeller is referred to as a high-speed region, and a region within which the flow rate of the gas in the vicinity of the inner surface of the casing is lower than the flow rate of the gas that is delivered from the impeller is referred to as a low-speed region, the collection face may be located within the low-speed region.

In the solvent separation apparatus, the inlet may be located on a surface of the casing, the surface intersecting with the rotating shaft, the outlet may be located toward a direction that intersects with the rotating shaft, and the collection face may be located within an inner surface of the casing, the surface facing the surface on which the inlet is located.

In the solvent separation apparatus, when a region within which a heat insulation material is placed over the casing is referred to as a heat insulation region, and a region within which any heat insulation material is not placed is referred to as a heat release region, the collection face may be located within the heat release region.

Furthermore, according to the third aspect of the disclosure, provided is a solvent separation system, including: the above-described solvent separation apparatus according to the second aspect of the disclosure, the apparatus being placed downstream of an exhaust gas-generating apparatus generating a gas including a volatilized solvent; and a condensation apparatus that is placed between the exhaust gas-generating apparatus and the solvent separation apparatus, and that condenses the volatilized solvent.

The above-described solvent separation system may further include a dust collection part that applies an electric field to the gas discharged from the solvent separation apparatus, downstream of the solvent separation apparatus, to separate the volatilized solvent that remains in the gas.

The solvent separation method, the solvent separation apparatus and the solvent separation system according to the above-described aspects of the disclosure respectively make it possible to easily collect a solvent that is removed from the exhaust atmosphere, and further make it possible to easily carry out maintenance of exhaust pathways.

DESCRIPTION OF EMBODIMENTS

Hereinafter, embodiments of the disclosure will be described with reference to drawings.

First Embodiment

Figure 1:
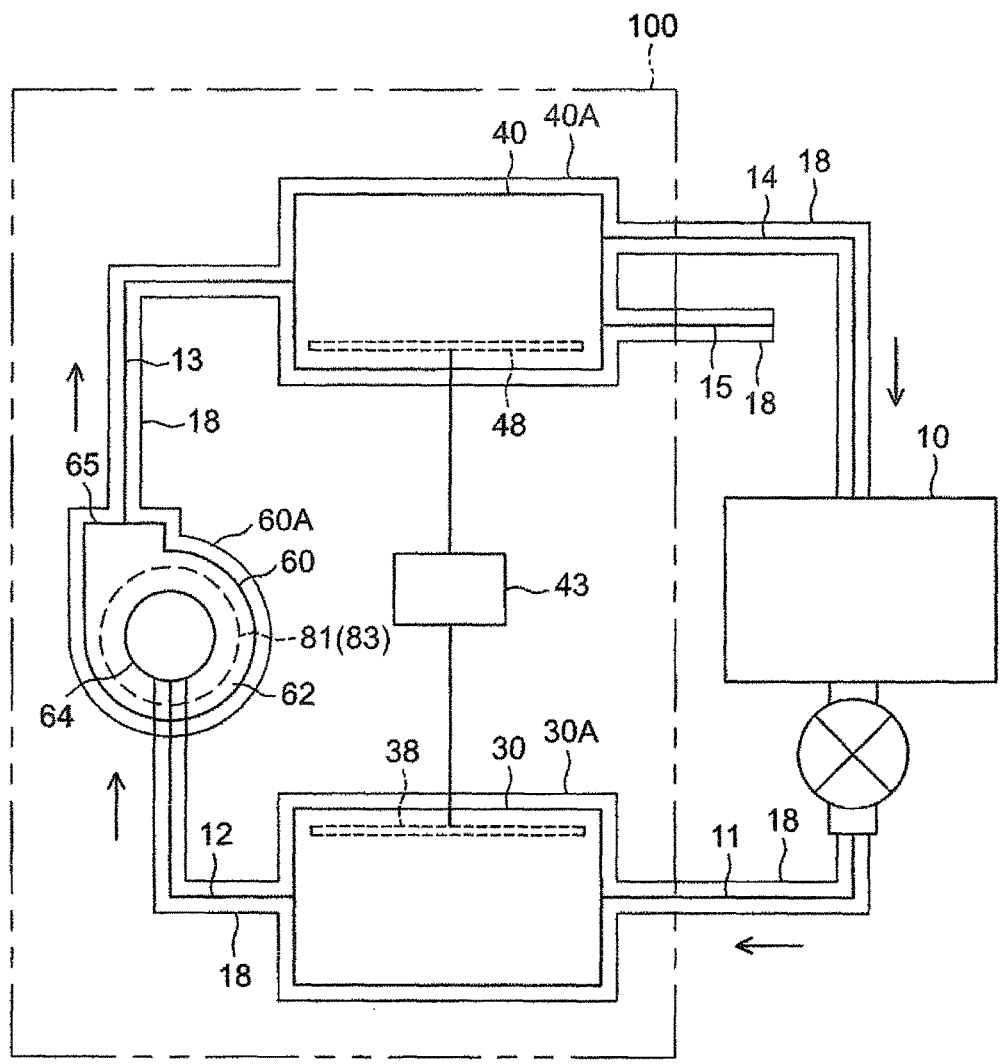
FIG. 1 is a diagram that shows a structure of the solvent separation system according to the first embodiment of the disclosure.

FIG. 1 is a diagram that shows a structure of a solvent separation system 100 according to the first embodiment of the disclosure. The solvent separation system 100 is connected to a heat treatment apparatus 10, which is one example of an exhaust gas-generating apparatus. The solvent separation system 100 includes: a condensation part 30, which is one example of a condensation apparatus; a dust collection part 40; a dust collection fan 60; and a voltage-applying apparatus 43. The dust collection fan 60 corresponds to one example of the solvent separation apparatus according to the first embodiment of the disclosure. The solvent separation system 100 can be incorporated into, for example, one exhaust-heat-circulation unit.

The heat treatment apparatus 10 is a furnace (e.g., a sintering furnace, dry furnace, cure furnace and reflow furnace) that carries out a heat treatment. In the heat treatment, various types of materials or elements, which are objects to be heated, are heated. A solvent is volatilized into the atmosphere (gas) inside the heat treatment apparatus 10 through the heat treatment. A part of the atmosphere including the volatilized solvent is led to a first exhaust duct 11 that is located so as to communicate with the heat treatment apparatus 10. The first exhaust duct 11 is thermally insulated from the outside by a heat insulation material 18, and the exhaust atmosphere is led downstream in a thermally insulated state.

The condensation part 30 communicates with the downstream side of the first exhaust duct 11. The exhaust atmosphere is delivered into the condensation part 30 through the first exhaust duct 11. The condensation part 30 is thermally insulated from the outside by a heat insulation material 30A, and the exhaust atmosphere is treated in a thermally insulated state.

An electrode 38 is placed inside the condensation part 30. When a voltage is applied to the electrode 38 by a voltage-applying apparatus 43, the electrode 38 generates an electric field inside the condensation part 30. As details will be described below, molecules of the polar and volatilized solvent come to a state in which they are present eccentrically around the side of the electrode 38 due to electrostatic attraction when an electric field is applied to the exhaust atmosphere, and a bias in the concentration of the solvent in the exhaust atmosphere will be caused. Furthermore, molecules of the solvent attract one another due to the Coulomb's force, and gradually condense. The exhaust atmosphere including condensed molecules of the solvent is led to the second exhaust duct 12 that is located so as to communicate with the condensation part 30. The second exhaust duct 12 is thermally insulated from the outside by the heat insulation material 18, and the exhaust atmosphere is led downstream in a thermally insulated state.

The dust collection fan 60 communicates with the downstream side of the second exhaust duct 12. The second exhaust duct 12 is connected to an inlet 64 of the dust collection fan 60. An impeller 71 (see FIGS. 4 and 5) is placed inside a casing 62 of the dust collection fan 60, and, when the impeller 71 is rotated, the exhaust atmosphere is introduced from the inlet 64 into the casing 62.

A heat insulation material 60A is placed over all but one part of the outer surface of the casing 62. A collection face 83 is located inside the casing 62. As details will be described below, the collection face 83 is maintained at a temperature lower than the temperature of the exhaust atmosphere that is delivered into the casing 62.

When the collection face 83 is maintained at such a low temperature, the temperature of the exhaust atmosphere that comes into contact with the collection face 83 is decreased, and, as a result, a part of the solvent is devolatilized. In this case, the solvent has been condensed in the condensation part 30, which is located upstream, and therefore, the solvent is in a state in which it is likely to devolatilize. The devolatilized solvent adheres to the collection face 83, and is thus removed from the exhaust atmosphere. The exhaust atmosphere from which a part of the solvent has been removed is discharged from an outlet 65, and is led to a third exhaust duct 13 that is located so as to communicate with the outlet 65. The third exhaust duct 13 is thermally insulated from the outside by a heat insulation material 18, and the exhaust atmosphere is led downstream in a thermally insulated state.

The dust collection part 40 communicates with the downstream side of the third exhaust duct 13. The exhaust atmosphere is delivered from the dust collection fan 60 into the dust collection part 40 through the third exhaust duct 13. The dust collection part 40 is thermally insulated from the outside by a heat insulation material 40A, and the exhaust atmosphere is treated in a thermally insulated state. An electrode 48 is placed inside the dust collection part 40. When a voltage is applied to the electrode 48 by the voltage-applying device 43, the electrode 48 generates an electric field inside the dust collection part 40. As details will be described below, molecules of the solvent that remains in the exhaust atmosphere come to a state in which they are present eccentrically around the side of the electrode 48 due to electrostatic attraction when an electric field is applied to the exhaust atmosphere, and the exhaust atmosphere is separated into a portion including the solvent, and a portion not including the solvent.

A circulation duct 14 and a discharge duct 15 are placed so as to communicate with the dust collection part 40. The portion of the exhaust atmosphere that does not include the solvent is led to the circulation duct 14, and is returned to the heat treatment apparatus 10. On the other hand, the portion of the exhaust atmosphere that includes the solvent is led to the discharge duct 15, is discharged to the outside of the dust collection part 40, and is collected. The circulation duct 14 and the exhaust duct 15 are thermally insulated from the outside by the heat insulation material 18, and the exhaust atmosphere is led downstream in a thermally insulated state.

As described above, the exhaust atmosphere that includes volatilized solvents is led to the condensation part 30, the dust collection fan 60 and the dust collection part 40 in this order, and thus, the solvent is removed in the dust collection fan 60 and the dust collection part 40. The atmosphere from which the solvent has been removed is again returned into the heat treatment apparatus 10. Details on the condensation part 30, the dust collection fan 60, and the dust collection part 40 will be described below.

Figure 2:
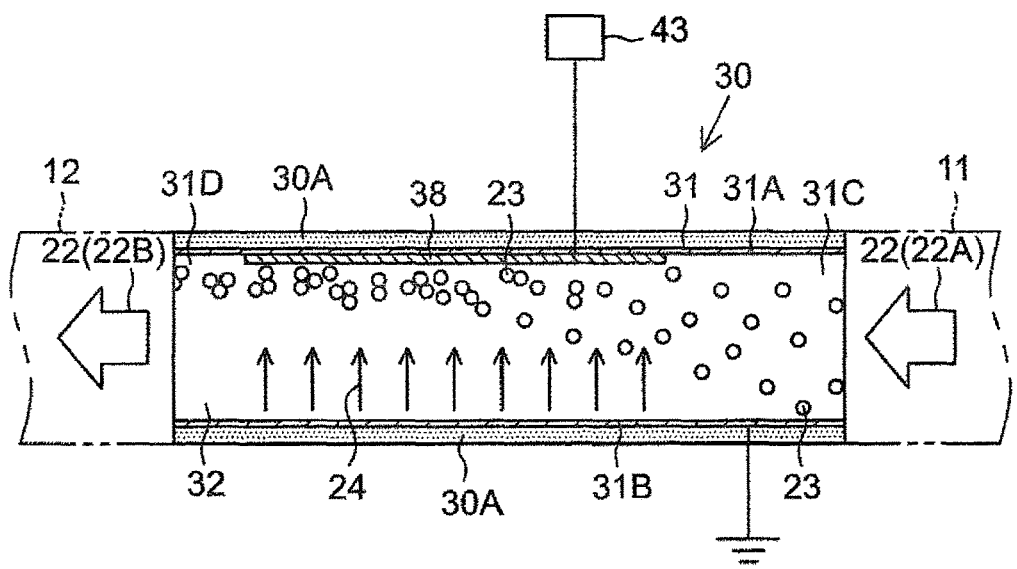
FIG. 2 is a front cross-section view of a condensation part.
Figure 2:
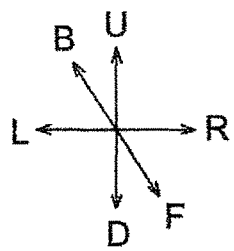

First of all, the condensation part 30 will be described. FIG. 2 is a front cross-section view of the condensation part 30. In the following drawings, arrow R refers to the right direction; arrow L refers to the left direction; arrow U refers to the upward direction; arrow D refers to the downward direction; arrow F refers to the forward direction; and arrow B refers to the backward direction.

As shown in FIG. 2, the condensation part 30 includes a tubular member 31, a heat insulation material 30A and an electrode 38. For example, the tubular member 31 has a rectangular/square column shape, and has at least a first wall surface 31A (e.g., an inner wall surface) and a second wall surface 31B. The first wall surface 31A and the second wall surface 31B are provided in locations where they face each other. A flow channel 32 that causes the exhaust atmosphere 22 to flow in a given direction is formed inside the tubular member 31. A first exhaust duct 11 is provided on the side of an inlet 31C of the tubular member 31, and a second exhaust duct 12 is provided on the side of an outlet 31D of the tubular member 31.

The heat insulation material 30A is located on the outer surface of the tubular member 31. The tubular member 31 is thermally insulated from the outside by the heat insulation material 30A, and the exhaust atmosphere 22 that is introduced into the tubular member 31 is subjected to a condensation treatment in a thermally insulated state. Accordingly, a loss in thermal energies that the exhaust atmosphere 22 possesses can be suppressed, and, at the same time, it becomes possible to prevent the volatilized solvents 23 from devolatilizing and adhering to the interior of the tubular member 31.

The electrode 38 is provided along the first wall surface 31A so as to extend in the direction in which the exhaust atmosphere 22 flows. A voltage is applied to the electrode 38 by a voltage-applying apparatus 43. The amount of voltage applied thereto is determined, as appropriate, in consideration of the concentration of the solvent 23, the length of the electrode 38, the flow rate of the exhaust atmosphere 22, the size of the flow channel 32, etc. The first wall surface 31B that faces the first wall surface 31A is electrically insulated from the electrode 38, and is connected to a grounding member.

When a voltage is applied to the electrode 38, a potential difference is caused between the second wall surface 31B and the electrode 38, and an electric field 24 is caused inside the condensation part 30. The electric field 24 is caused in a direction that intersects with the direction in which the exhaust atmosphere 22 flows.

When the electric field is applied to the exhaust atmosphere (22A) that has been introduced from the first exhaust duct 11, molecules of the solvent 23 having polarity in their molecular structures come into a state in which they are present eccentrically around the side of the electrode 38 due to electrostatic attraction, and a bias in the concentration of the solvent in the exhaust atmosphere 22 will be caused. In this case, electrostatic attraction means that a positively charged material is attracted by a negative electrical charge, and that a negatively charged material is attracted by a positive electrical charge. Furthermore, a positively polarized part of one molecule of the solvent 23, and a negatively polarized part of another molecule of the solvent 23 attract one another due to the Coulomb's force. Accordingly, molecules of the solvent 23 gradually condense. The exhaust atmosphere 22 (22B) including condensed molecules of the solvent 23 is led to the second exhaust duct 12 that is located at the side of the outlet 31D of the tubular member 31.

Figure 3:
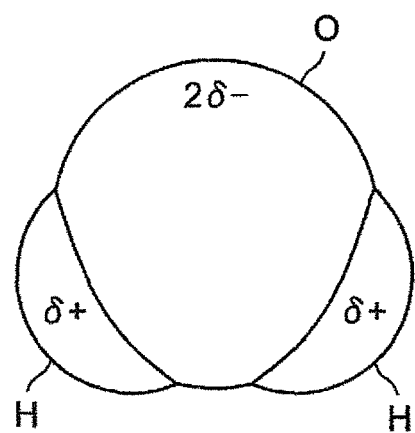
FIG. 3 is a diagram that shows a molecular structure of water.

Now, polarity of molecules of the solvent 23 will be described. FIG. 3 is a diagram that shows a molecular structure of water. As shown in FIG. 3, since water has polarity in relation to its molecular structure, water has an electrical bias. Any other solvents such as ethanol have the same property. In general, materials used as solvents have such polarity in relation to their molecular structures, and therefore, have properties that make it possible to easily dissolve other materials. In other words, it is considered that most of materials used as solvents have polarity. When molecules of solvents having such polarity are placed in an electric field, the molecules of solvents are attracted to the electrode due to electrostatic attraction even if the electrode that causes the electric field is either positive or negative. This is because, by electrostatic attraction, negatively polarized parts of molecules of solvents are drawn in cases where the electrode is positive, and positively polarized parts of molecules of solvents are drawn in cases where the electrode is negative. In addition, even in cases where there is no polarity in molecules of solvents, electrostatic polarization is caused, and they come into a state in which they acquire polarity, when the molecules of solvents are placed in the electric field. Accordingly, even if molecules of solvents do not possess any polarity, they behave in the same manner as molecules of solvents having polarity, when an electric field is applied to them.

Figure 4:
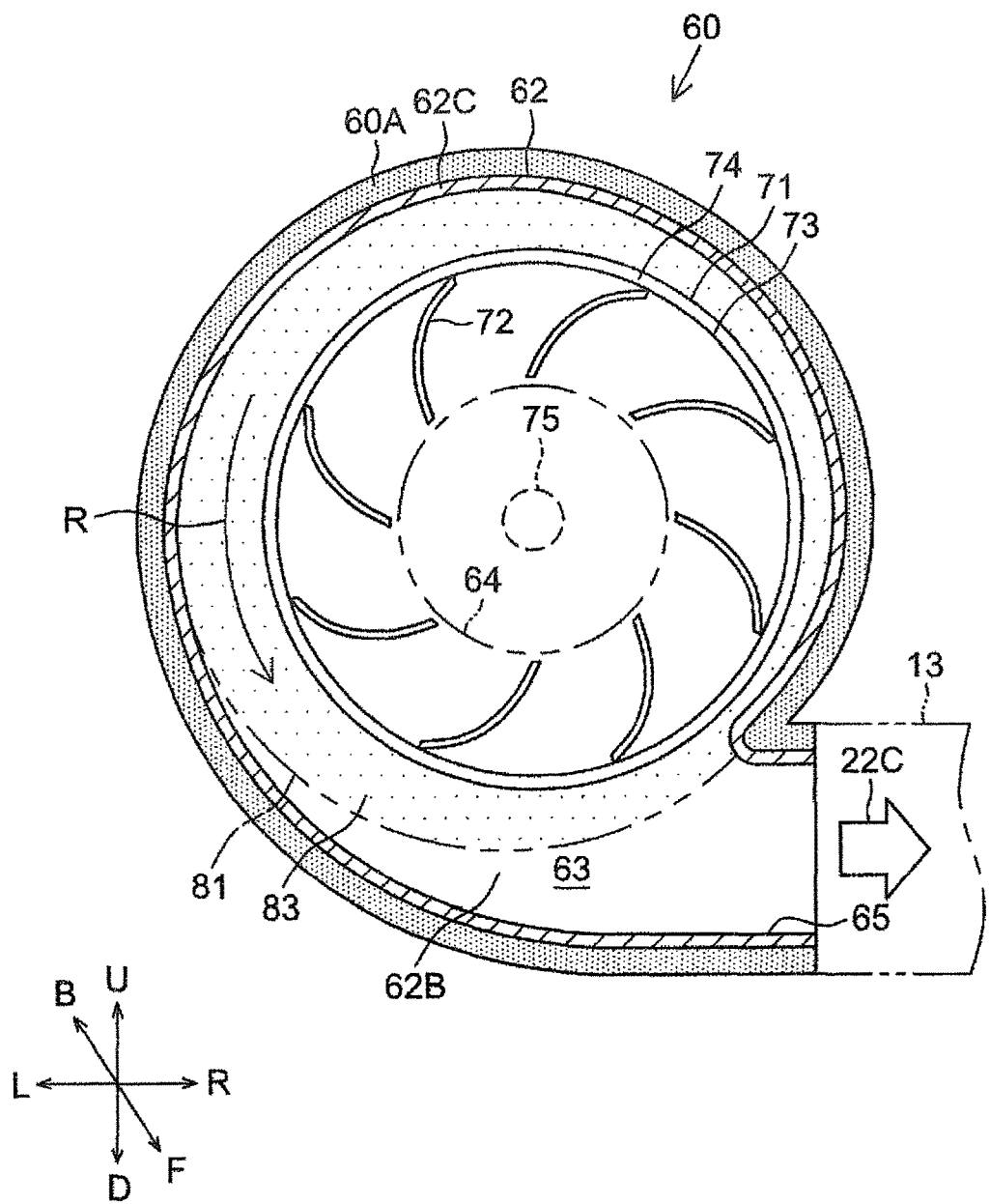
FIG. 4 is a front cross-section view of a dust collection fan.

Next, the dust collection fan 60 will be described. FIG. 4 is a front cross-section view of the dust collection fan 60. As shown in FIG. 4, the dust collection fan 60 includes a casing 62, an impeller 71, and a collection part 81. The dust collection fan 60 in this embodiment is a sirocco fan, which is one type of centrifugal fans. However, the dust collection fan 60 is not limited to a sirocco fan, and may be a turbo fan, which is also one type of centrifugal fans, or may be an axial flow fan, which delivers a gas in the rotating axial direction.

The impeller 71 includes multiple blades 72, a support plate 73, and a ring part 74. The multiple blades 72 are curved plate-like members, and are arrayed around a rotating shaft 75 at regular intervals. Rear end portions of the multiple blades 72 are respectively supported by the support plate 73. The support plate 73 is a disk-shaped member, and its center part is connected with the rotating shaft 75. The rotating shaft 75 penetrates into a back plate 62B of the casing 62 in such a manner that it is capable of rotating the back plate 62, and is connected with a motor M (see FIG. 5). Front end portions of the multiple blades 72 are respectively connected to the ring part 74, thereby retaining the strength. The impeller 71 is capable of rotating in the direction indicated by arrow R around the rotating shaft 75 by means of a driving force from the motor M.

The casing 62 is configured mainly by a front plate 62A (see FIG. 5), the back plate 62B and a side plate 62C, and has a storage space 63, and an inlet 64, and an outlet 65. The front plate 62A and the back plate 62B are located in such a manner that they face one another in the front-back direction. The side plate 62C is placed such that it connects the peripheries of the front plate 62A and the back plate 62B.

The storage space 63 is a space for storing the impeller 71 in such a manner that the impeller 71 can rotate. The inlet 64 is located in the center of the storage space 63 at the front side, and is an opening part for introducing the exhaust atmosphere 22 into the storage space 63. The inlet 64 is formed in the central part of the front plate 62A (see FIG. 5). A second exhaust duct 12 is connected to the inlet 64. Since the front plate 62A forms a face present in the direction that intersects with the rotating shaft 75, the exhaust atmosphere 22 (22B) that is introduced from the second exhaust duct 12 is introduced from the inlet 64 toward the axial direction of the rotating shaft 75, i.e., from the front side toward the rear side.

The outlet 65 is located at the right side of the lower part of the casing 62 in FIG. 4, projecting therefrom, and is an opening part for discharging the exhaust atmosphere 22 (22C) from the storage space 63. The outlet 65 is located in the direction that intersects with the rotating shaft 75, i.e., toward the right direction in FIG. 4. When the impeller 71 is rotated in the direction indicated by arrow R, the exhaust atmosphere 22 (22B) that has been introduced into the central part of the impeller 71 from the inlet 64 passes through respective spaces between blades 72 from the central part of the impeller 71 due to the centrifugal force, and is released toward the outward radial direction. Then, the exhaust atmosphere 22 (22C) circles to the direction indicated by arrow R inside the storage space 63 along the side plate 62C of the casing 62, and is discharged from the outlet 65 by the centrifugal force.

The collection part 81 is placed in the back plate 62B. In this embodiment, a part of the back plate 62B is arranged as the collection part 81, and the surface of the collection part 81 adjacent to the storage space 63 (the inner surface of the collection part 81) is arranged as the collection face 83. Furthermore, in this embodiment, when the direction from the front side toward the rear side of the rotating shaft 75 is considered as a front view (first direction), the collection face 83 is formed circularly in an outer peripheral area that is located lateral to the impeller 71 in the radial direction, from the front view. In other words, the collection face 83 is placed circularly so as to surround the impeller 71 from the front view.

A heat insulation material 60A is placed around the outer surface of the casing 62. However, the heat insulation material 60A is not located in a circular region of an outer surface of the back plate 62B, the region corresponding to the collection part 81 and the collection face 83 (see FIG. 5). Accordingly, heat is released from the collection face 83 through the back plate 62B of the casing 62. Even when a high-temperature exhaust atmosphere 22 is delivered into the casing 62, the surface of the collection face 83 is cooled by the heat release, and is maintained at a temperature lower than that of the exhaust atmosphere 22.

Figure 5:
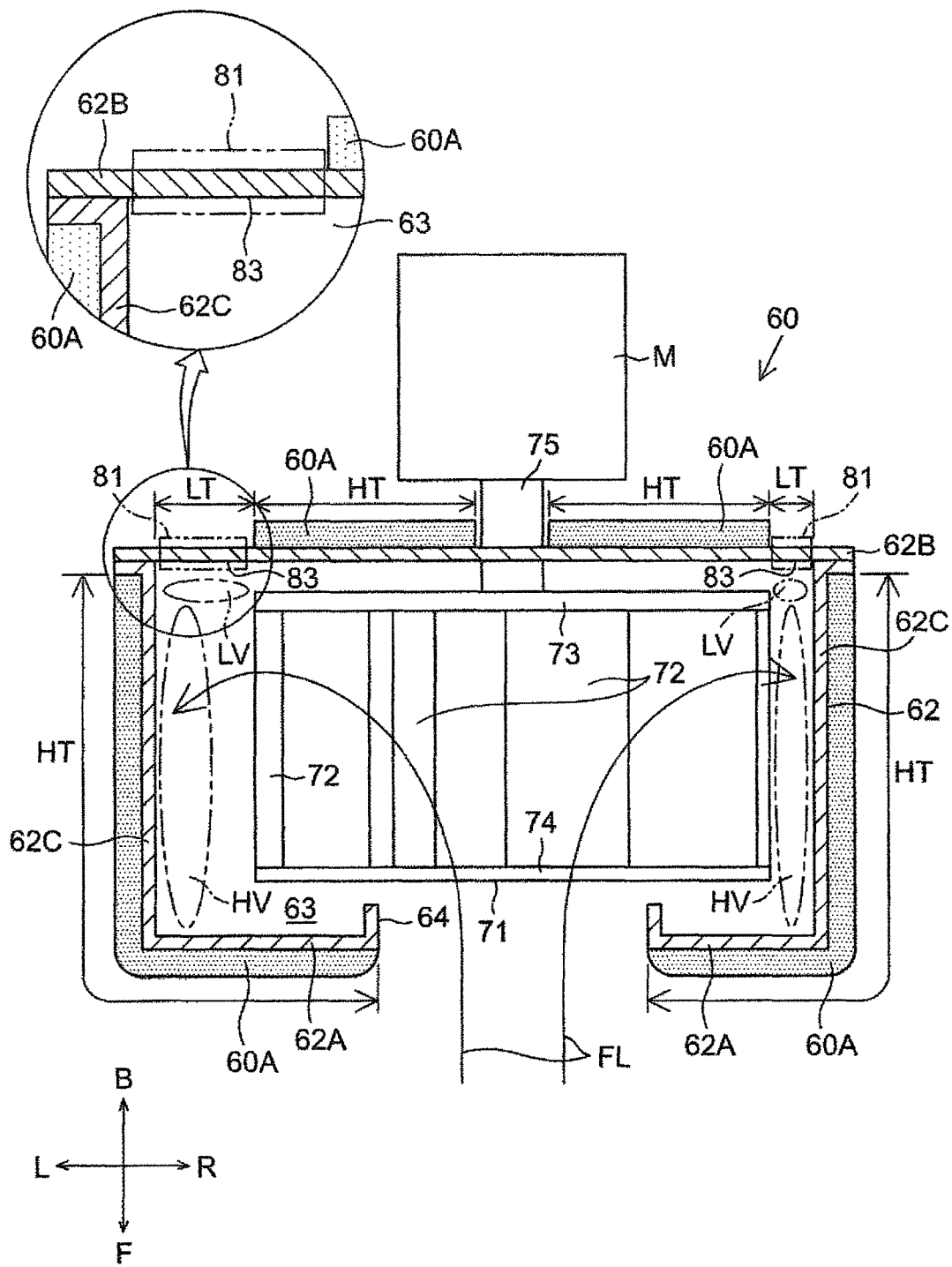
FIG. 5 is a plane cross-section view of the dust collection fan.

FIG. 5 is a plane cross-section view of the dust collection fan 60. As described above, the heat insulation material 60A is not located in the circular region of the outer surface of the back plate 62B, the region corresponding to the collection part 81 and the collection face 83. The circular region of the outer surface of the casing 62 that corresponds to the collection part 81 and the collection face 83 and where the heat insulation material 60A is not located is referred to as a heat release region LT. In addition, the region that does not correspond to the collection part 81 and the collection face 83 and where the heat insulation material 60A is located is referred to as a heat insulation region HT.

When the impeller 71 is rotated, the exhaust atmosphere 22 is introduced from the inlet 64 into the storage space 63 toward an axial direction of the rotating shaft 75, i.e., from the front side toward the rear side, as shown by arrow FL. The exhaust atmosphere 22 that has been introduced from the inlet 64 into the central part of the impeller 71 inside the storage space 63 passes through spaces between blades 72 from the central part of the impeller 71 due to the centrifugal force, and is released toward the outward radial direction of the impeller 71, as shown by arrow FL. Then, the exhaust atmosphere 22 circles to the direction indicated by arrow R (see FIG. 4) inside the storage space 63 along the side plate 62C of the casing 62, and is discharged from the outlet 65 by the centrifugal force.

In that case, the exhaust atmosphere 22 that is released from the impeller 71 is blown directly onto a region in the vicinity of the side plate 62C inside the storage space 63. Therefore, the flow rate of the exhaust atmosphere 22 in the region in the vicinity of the side plate 62C is approximately equal to the flow rate of the exhaust atmosphere 22 that is released from the impeller 71, and thus, is high. Therefore, the region in the vicinity of the side plate 62C is referred to as a high-speed region HV. On the other hand, a region in the vicinity of the outer peripheral part of the back plate 62B is not a region onto which the exhaust atmosphere 22 released from the impeller 71 is blown directly. Accordingly, the flow rate of the exhaust atmosphere 22 in the region in the vicinity of the outer peripheral part of the back plate 62B is lower than the flow rate of the exhaust atmosphere 22 that is released from the impeller 71. Therefore, the region in the vicinity of the back plate 62B is referred to as a low-speed region LV. In this embodiment, the collection face 83 of the collection part 81 is arranged so as to locate in the low-speed region LV.

That is, the collection face 83 is located in the heat release region LT where the heat insulation material 60A is not located and in the low-speed region LV where the flow rate of the exhaust atmosphere 22 is relatively low. Accordingly, the surface of the collection face 83 is cooled by heat release, and is maintained at a temperature lower than the temperature of the exhaust atmosphere 22 that is delivered into the casing 62.

Since the temperature of the collection face 83 is lower than the temperature of the exhaust atmosphere 22, the temperature of the exhaust atmosphere 22 that has come into contact with the collection face 83 is decreased. As a result, the saturated vapor pressure of the solvent 23 is decreased, and a part of molecules of the solvent 23 is devolatilized on the collection face 83. In this case, since the molecules of the solvent 23 have been condensed by the condensation part 30 that is located in the upstream part, the molecules of the solvent 23 are in a state in which they are likely to devolatilize. The devolatilized solvent 23 adheres to the collection face 83, and thus, is removed. Consequently, a part of the solvent 23 that had been included in the exhaust atmosphere 22 is removed, and the concentration of the solvent in the exhaust atmosphere 22 can be reduced.

The solvent 23 that has been adhered to the collection face 83 can be removed by disassembling the casing 62 to carry out its maintenance. As shown in FIG. 5, the back plate 62B (one example of the first part) and the side plate 62C (one example of the second part) of the casing 62 are respectively configured by separate members, and are fixed by bolts and/or the like (not shown in the figure). The casing 62 can easily be disassembled by removing the bolts and/or the like to separate the back plate 62B and the side plate 62C, thereby carrying out maintenance of the inner surface (collection face 83) of the back plate 62B. In addition, although the front plate 62A and the side plate 62C are formed by a single member in FIG. 5, the front plate 62A and the side plate 62C may respectively be configured by separate members, and may be fixed by bolts and/or the like. In this case, the maintenance of the inside of the casing 62 can more easily be carried out.

Moreover, since the casing 62 has a heat insulation region HT that corresponds to a part other than the heat release region LT corresponding to the collection face 83 and that is maintained at a high temperature by the heat insulation material 60A, the solvent 23 is difficult to devolatilize in the casing 62. Accordingly, it becomes possible to prevent a devolatilized solvent 23 from adhering to the part of the casing 62 other than the collection face 83, thereby easily carrying out maintenance of the inside of the casing 62. Furthermore, since the collection face 83 is located in the low-speed region LV where the flow rate of the exhaust atmosphere 22 is relatively low, the surface temperature of the collection face 83 is difficult to elevate, and the devolatilized solvent 23 that has adhered to the collection face 83 can be prevented from again volatilizing.

Figure 6:
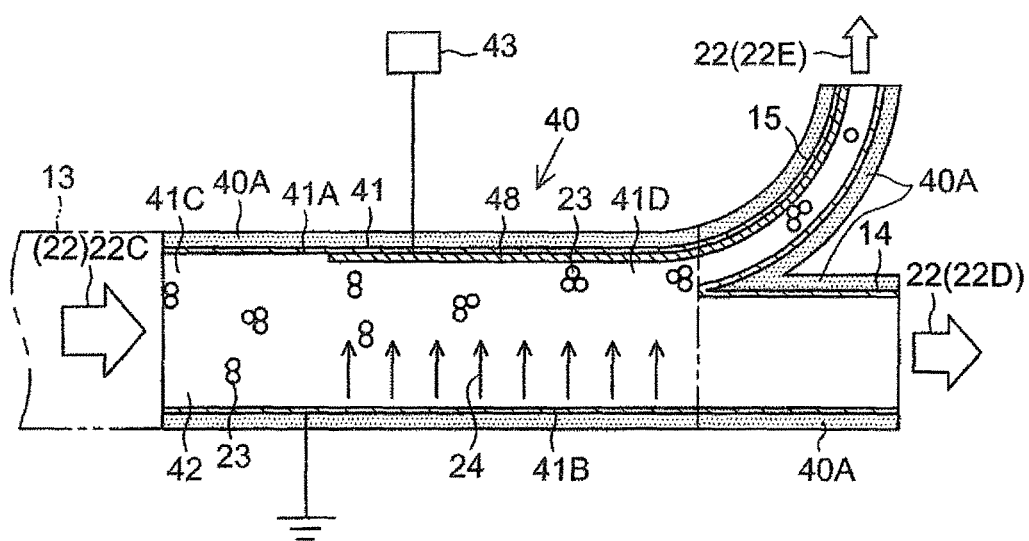
FIG. 6 is a front cross-section view of the dust collection part.
Figure 6:
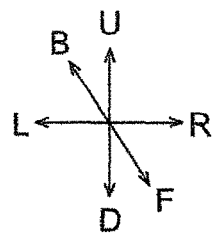

Next, the dust collection part 40 will be described. FIG. 6 is a front cross-section view of the dust collection part 40. As shown in FIG. 6, the dust collection part 40 is provided with a tubular member 41, a heat insulation material 40A and an electrode 48.

For example, the tubular member 41 is formed in a rectangular/square column shape, and has at least a first wall surface (e.g., inner wall surface) 41A and a second wall surface 41B. The wall surface 41A and the second wall surface 41B are provided in locations where they face one another. A flow channel 42 that makes it possible for the exhaust atmosphere 22 to flow in a given direction is formed inside the tubular member 41. A third exhaust duct 13 is provided at the side of the tubular member 41 where the inlet 41C is present. At the side of the tubular member 41 where an outlet 41D is present, a discharge duct 15 is provided along the first wall surface 41A, and the circulation duct 14 is provided along the second wall surface 41B. In other words, the side of the tubular member 41 where the outlet 41D is present is configured so as to branch into the discharge duct 15 and the circulation duct 14.

The heat insulation material 40A is located on the outer surface of the tubular member 41. The tubular member 41 is thermally insulated from the outside by the heat insulation material 40A, and the exhaust atmosphere 22 that is introduced into the tubular member 41 is subjected to a dust collection treatment in a thermally insulated state. Accordingly, a loss in heat energy that the exhaust atmosphere 22 possesses can be suppressed, and, simultaneously, the solvent 23 can be prevented from devolatilizing and thus adhering to the inside of the tubular member 41.

The electrode 48 is provided along the first wall surface 41A in such a manner that it extends toward the direction in which the exhaust atmosphere 22 flows. A voltage is applied to the electrode 48 by the voltage-applying apparatus 43. The amount of voltage applied thereto is determined as appropriate in consideration of the concentration of the solvent 23, the length of the electrode 48, the flow rate of the exhaust atmosphere 22, the size of the flow channel 42, etc. The second wall surface 41B facing the first wall surface 41A is electrically insulated from the electrode 48, and is connected to a grounding member. In addition, the electrode 48 is provided from the first wall surface 41A to at least a branching part of the wall surface of the discharge duct 15 that is continuous with the first wall surface 41A.

When a voltage is applied to the electrode 48, a potential difference is caused between the second wall surface 41B and the electrode 48, and an electric field 24 is caused inside the dust collection part 40. The electric field 24 is caused in a direction that intersects with the direction in which the exhaust atmosphere 22 flows.

When the electric field is applied to the exhaust atmosphere (22C) that has been introduced from the third exhaust duct 13, molecules of the solvent 23 having polarity in their molecular structures come into a state in which they are present eccentrically around the side of the electrode 48 due to electrostatic attraction, and a bias in the concentration of the solvent in the exhaust atmosphere 22 occurs. Then, the exhaust atmosphere 22 (22E) including the solvent 23 concentrated in the vicinity of the electrode 48 is led to the discharge duct 15, is discharged to the outside of the dust collection part 40, and is then collected. On the other hand, the exhaust atmosphere 22 (22D) from which the solvent 23 has been removed is led to the circulation duct 14, is discharged to the outside of the dust collection part 40, and is again introduced into the heat treatment apparatus 10.

In addition, although the electrode 48 is located on the side of the upper first wall surface 41A in FIG. 6, the first wall surface 41A on which the electrode 48 is placed may be located on the down side, and the second wall surface 41B may be located on the upper side. In this case, due to the weight of the solvent 23, the exhaust atmosphere 22 including the solvent 23 is likely to concentrate in the vicinity of the electrode 48, which is located downward, and the exhaust atmosphere 22 including the solvent 23 can easily be led to the discharge duct 15.

According to the first embodiment, it becomes possible to remove the solvent 23 that has been adhered to the collection face 83 of the dust collection fan 60, by disassembling the casing 62 to thus carry out its maintenance. Additionally, since a part of the dust collection fan 60 other than the collection face 83 and the exhaust pathways are maintained at a high temperature, the solvent 23 is difficult to devolatilize and to adhere to that part and the exhaust pathways. Accordingly, it becomes possible to easily collect the solvent 23 removed from the exhaust atmosphere 22 and to easily carry out maintenance of the exhaust pathways.

Moreover, molecules of the solvent 23 are condensed by the condensation part 30 at the upstream side of the collection fan 60. Accordingly, the solvent 23 can easily be devolatilized and removed by the dust collection fan 60.

Furthermore, at the downstream side of the dust collection fan 60, the solvent 23 that has not been removed by the dust collection fan 60 and that remains is removed by the dust collection part 40. Accordingly, the collection rate of the solvent 23 included in the exhaust atmosphere 22 can be increased.

Variation Examples

FIGS. 7A to 7D are diagrams that show variation examples of the collection part 81 of the dust collection fan 60. As shown in FIGS. 7A to 7D, the collection part 81 may be arranged as a member separate from the back plate 62B of the casing 62, and may be fixed by a removable bolt (not shown in the figure) and/or the like. In this case, only the collection part 81 can be removed from the back plate 62B of the casing 62 to the outward direction, and thus, the solvent 23 that has adhered to the collection face 83 can be removed. Therefore, compared with cases in which the casing 62 is disassembled, it becomes easier to carry out maintenance of the dust collection fan 60.

Figure 7A:
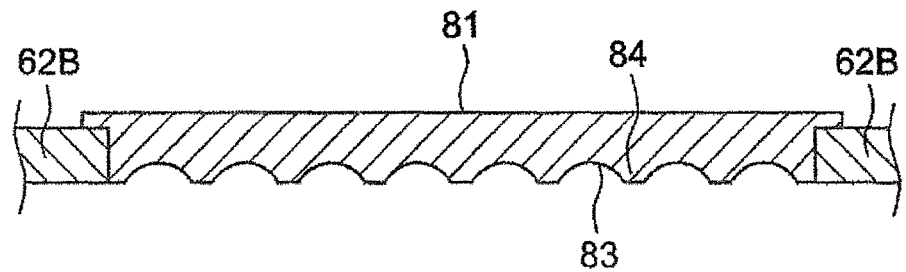
FIGS. 7A to 7D are diagrams that show variation examples of a collection part of the dust collection fan.
Figure 7B:
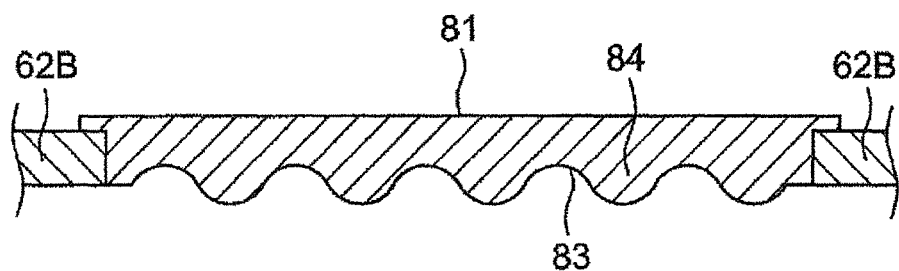
Figure 7C:
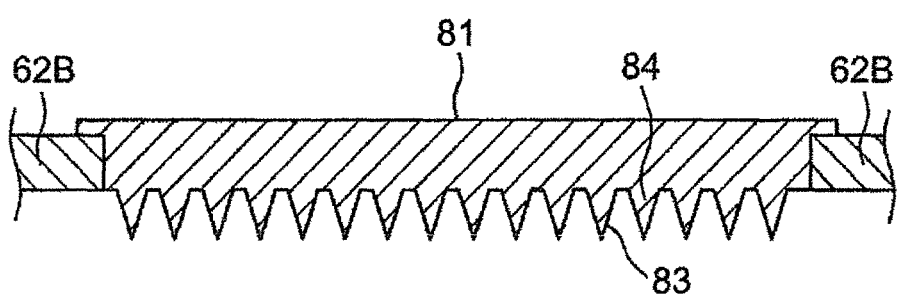
Figure 7D:
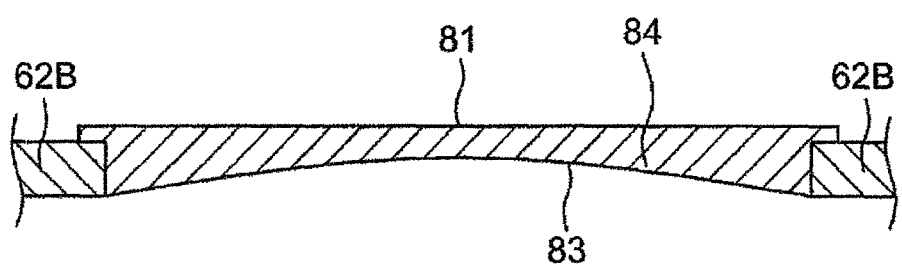

The collection part 81 may have a surface area-enlarging part 84 at the side of the collection face 83. The surface area-enlarging part 84 is provided in order to enlarge the surface area of the collection face 83. In FIG. 7A, the surface area-enlarging part 84 has multiple dimple shapes. In FIG. 7B, the surface area-enlarging part 84 has multiple concavo-convex shapes. In FIG. 7C, the surface area-enlarging part 84 has multiple needle shapes. In FIG. 7D, the surface area-enlarging part 84 has one concave shape. Furthermore, the surface area-enlarging part 84 may have a shape configured by any combination of the above-mentioned dimple shapes, concavo-convex shapes, concave shape and needle shapes. The collection face 83 is provided on the surface of the surface area-enlarging part 84. By providing the surface area-enlarging part 84, the surface area of the collection face 83 can be increased, and therefore, the solvent 23 can efficiently be adhered thereto. In addition, the surface area-enlarging part 84 is not limited to these shapes. The surface area-enlarging part 84 can have any shape as long as the shape can enlarge the surface area of the collection face 83.

Figure 8:
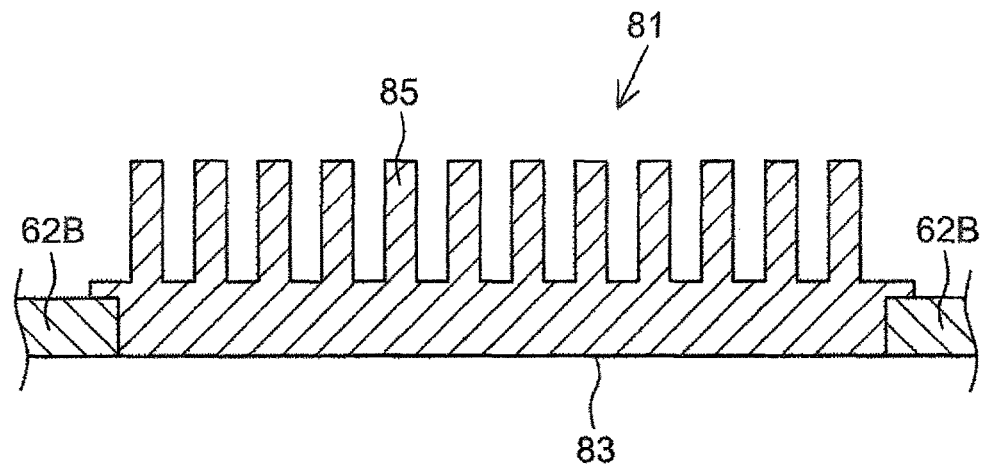
FIG. 8 is a diagram that shows another variation example of the collection part of the dust collection fan.

FIG. 8 is a diagram that shows another variation example of the collection part 81 of the dust collection fan 60. As shown in FIG. 8, a heat sink 85 may be provided on the outer surface of the collection part 81. The heat sink 85 is provided in order to enhance heat-releasing properties of the collection face 83. By providing the heat sink 85, the collection face 83 can be maintained at a low temperature, and therefore, it becomes easier to devolatilize the solvent 23 that is in contact with the collection face 83. In addition, the heat sink 85 and the above-mentioned surface area-enlarging parts 84 may be combined.

Figure 9:
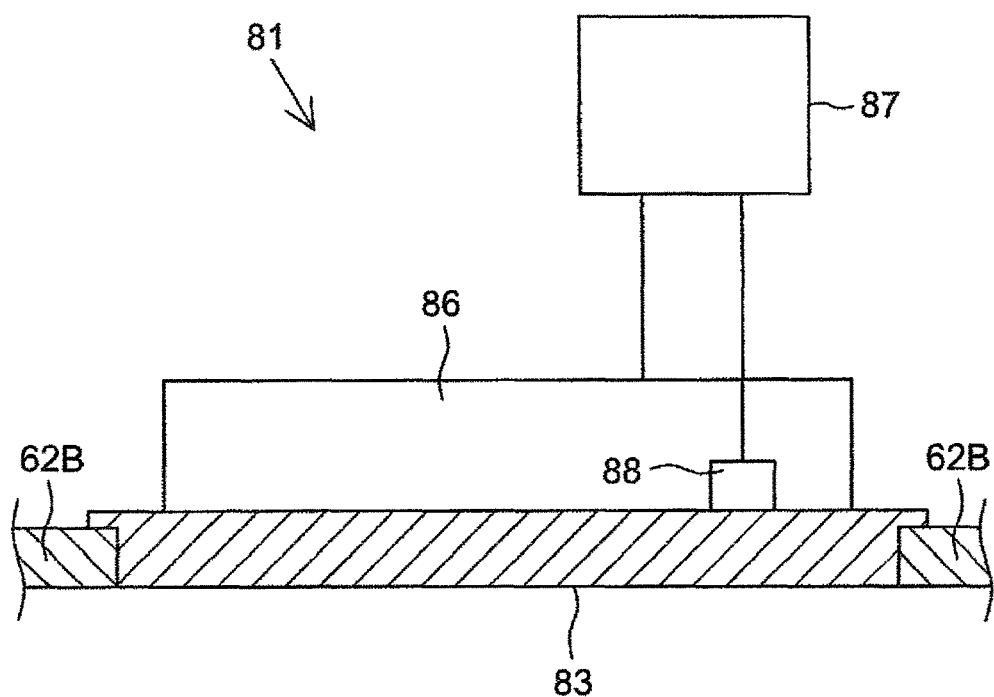
FIG. 9 is a diagram that shows yet another variation example of the collection part of the dust collection fan.
Figure 10:
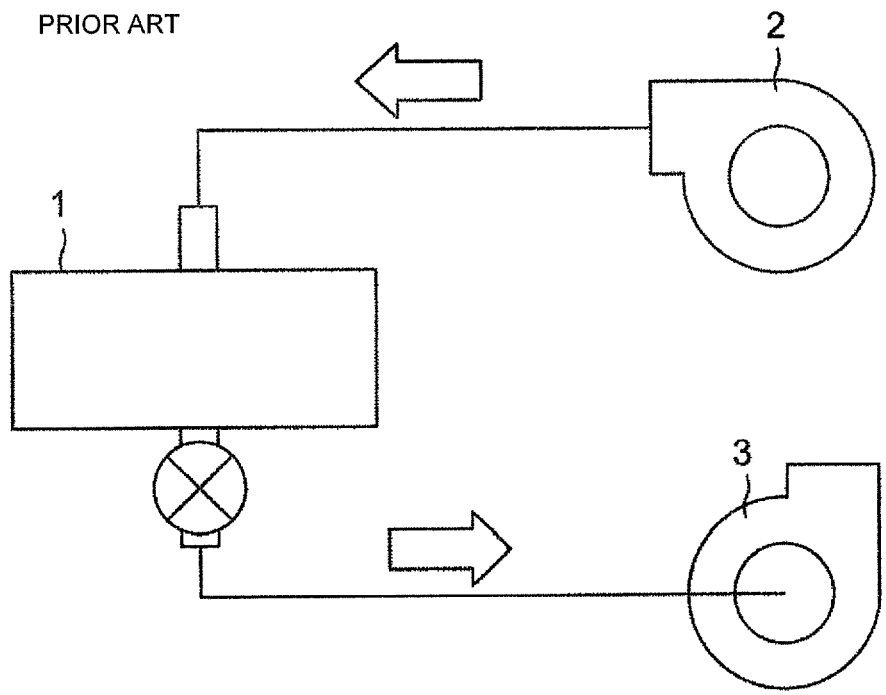
FIG. 10 is a diagram that illustrates a conventional exhaust gas-purifying apparatus.
Figure 11:
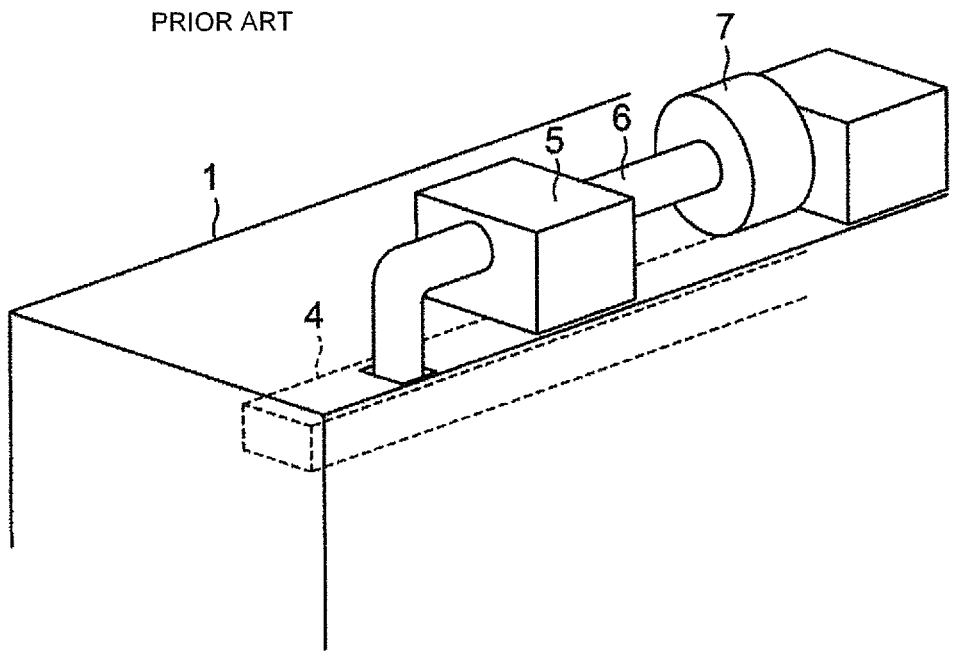
FIG. 11 is a diagram that illustrates a conventional exhaust gas-purifying apparatus.

FIG. 9 is a diagram that shows yet another variation example of the collection part 81 of the dust collection fan 60. The collection part 81 may have a cooling part 86 and a temperature-controlling part 87. The cooling part 86 is a part that forcibly cools the collection face 83. For example, the cooling part 86 has a mechanism that forcibly cools the collection face 83 by blowing in with a blast fan or by circulating a refrigerant. The temperature-controlling part 87 controls operation of the cooling part 86 to thereby control the temperature of the collection face 83. The temperature-controlling part 87 has a sensor 88 that detects the temperature of the collection face 83. The temperature-controlling part 87 controls operation of the cooling part 86 based on detection signals from the sensor 88, thereby controlling the temperature of the collection face 83. In this case, the collection face 83 can reliably be maintained at a temperature lower than the temperature of the exhaust atmosphere that is delivered into the casing 62, and thus, it becomes easier to devolatilize the solvent 23 that is in contact with the collection face 83. In addition, without providing the temperature-controlling part 87, only the cooling part 86 that forcibly cools the collection face 83 may be provided. In this case, although the temperature of the collection face 83 cannot be controlled, the collection face 83 can be maintained at a temperature lower than the temperature of the exhaust atmosphere that is delivered into the casing 62.

Additionally, although the condensation part 30, the dust collection part 40 and the dust collection fan 60 are provided in this embodiment, the solvent separation system 100 may be formed by the dust collection part 40 and the dust collection fan 60, depending on the concentration of the solvent or required processing capability. Furthermore, the solvent separation system 100 may be formed by the condensation part 30 and the dust collection fan 60, which is one example of a solvent separation apparatus. In addition, an embodiment in which the solvent 23 is removed from the exhaust atmosphere 22 only by use of the dust collection fan 60 is possible.

Although one dust collection fan 60 is provided in this embodiment (see FIG. 1), multiple dust collection fans 60 may be provided. For example, in FIG. 1, multiple dust collection fans 60 may be connected in parallel to the second exhaust duct 12, and dust collection fans 60 that incorporate the exhaust atmosphere 22 may be switched by a valve. In this case, when dust collection fans 60 are maintained, a dust collection fan 60 that is subjected to the maintenance can be separated from exhaust gas pathways by manipulating the valve, and other remaining dust collection fans 60 that are not subjected to the maintenance can be operated. This makes it possible to maintain dust collection fans 60 without causing the heat treatment apparatus 10 and the solvent separation system. 100 to stop operation.

According to the above-described embodiments, it becomes possible to easily collect the solvent removed from the exhaust atmosphere, and thus, maintenance of exhaust gas pathways can easily be carried out.

Although embodiments of the disclosure are described above, the above-described embodiments are merely examples for carrying out the disclosure. Therefore, the disclosure is not limited to the above-described embodiments, and the above-described embodiments can be modified as appropriate without departing from the scope of the disclosure.

Moreover, any of the above various embodiments/variation examples can be combined to achieve respective effects brought about by them. Furthermore, combination of embodiments, combination of examples, and combination of embodiments and examples are possible, and also, combination of features in different embodiments or examples is possible.

The solvent separation method, the solvent separation apparatus and the solvent separation system according to the above aspects of the disclosure make it possible to easily collect a solvent removed from the exhaust atmosphere, and make it possible to easily carry out maintenance of exhaust gas pathways. Accordingly, the solvent separation method, the solvent separation apparatus and the solvent separation system can be applied to exhaust gas generation apparatuses such as heat treatment apparatuses (e.g., drying furnaces, baking furnaces, cure furnaces, and reflow furnaces) in which various types of heat treatments are carried out in a process for producing various industrial products or electronic components.

What is claimed is:

1. A solvent separation method for removing a volatilized solvent from a gas, the method comprising:
   (i) rotating an impeller in a storage space of a casing to introduce the gas including the volatilized solvent from an inlet of the casing into the storage space; and
   (ii) cooling and devolatilizing the volatilized solvent that has been introduced into the storage space, by a collection face of a collection part that has been cooled so as to have a surface temperature lower than a temperature of the gas from the inlet, to thereby separate the volatilized solvent from the gas,
   wherein the collection face faces a surface of the casing on which the inlet is disposed, the collection face is disposed on an inner surface of the casing and in a region where the gas released from the impeller is not directly blown,
   the collection part includes a surface area-enlarging part at a side of the collection face.

2. The solvent separation method according to claim 1, further comprising, before Step (i), condensing the volatilized solvent with respect to the gas including the volatilized solvent.

3. The solvent separation method according to claim 1, further comprising, after Step (ii), applying an electric field to the gas from which the solvent has been separated, to thereby separate the volatilized solvent that remains in the gas.

4. The solvent separation method according to claim 2, further comprising, after Step (ii), applying an electric field to the gas from which the solvent has been separated, to thereby separate the volatilized solvent that remains in the gas.

5. A solvent separation apparatus, comprising:
   a casing having an impeller that is provided with multiple blades arrayed around a rotating shaft and that is capable of rotating around the rotating shaft, the casing further having a storage space in which the impeller is placed, an inlet for introducing a gas including a volatilized solvent into the storage space, and an outlet for discharging the gas from the storage space; and
   a collection part having a collection face that faces the storage space, wherein the collection face is cooled so as to have a surface temperature lower than the temperature of the gas that is introduced from the inlet,
   wherein the impeller is rotated to introduce the gas from the inlet into the storage space, and then, the volatilized solvent is cooled and devolatilized by the collection face to thereby separate the solvent from the gas,
   wherein the collection face faces a surface of the casing on which the inlet is disposed, the collection face is disposed on an inner surface of the casing and in a region where the gas released from the impeller is not directly blown,
   wherein the collection part includes a surface area-enlarging part at a side of the collection face.

6. The solvent separation apparatus according to claim 5, wherein:
   a region with a heat insulation material placed over a portion of the casing is referred to as a heat insulation region, and a region without heat insulation material placed over another portion of the casing is referred to as a heat release region; and
   the collection face is located within the heat release region.

7. A solvent separation system, comprising:
   the solvent separation apparatus according to claim 5 that is placed downstream of an exhaust gas-generating apparatus generating a gas including a volatilized solvent; and
   a condensation apparatus that is placed between the exhaust gas-generating apparatus and the solvent separation apparatus, and that condenses the volatilized solvent.

8. The solvent separation system according to claim 7, further comprising a dust collection part that applies an electric field to the gas discharged from the solvent separation apparatus, downstream of the solvent separation apparatus, to separate the volatilized solvent that remains in the gas.

* * * * *